(12) United States Patent
Yoo

(10) Patent No.: US 10,302,849 B2
(45) Date of Patent: May 28, 2019

(54) DISPLAY APPARATUS

(71) Applicant: SAMSUNG ELECTRONICS CO., LTD., Suwon-si (KR)

(72) Inventor: Jun-Mo Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/797,267

(22) Filed: Oct. 30, 2017

(65) Prior Publication Data
US 2018/0156968 A1 Jun. 7, 2018

(30) Foreign Application Priority Data
Dec. 5, 2016 (KR) .......................... 10-2016-0164495

(51) Int. Cl.
*F21V 8/00* (2006.01)
*G02F 1/1335* (2006.01)

(52) U.S. Cl.
CPC ........... *G02B 6/0085* (2013.01); *G02B 6/009* (2013.01); *G02B 6/0026* (2013.01); *G02B 6/0068* (2013.01); *G02F 1/133603* (2013.01); *G02F 1/133615* (2013.01); *G02F 2001/133614* (2013.01); *G02F 2001/133628* (2013.01)

(58) Field of Classification Search
None
See application file for complete search history.

(56) References Cited

U.S. PATENT DOCUMENTS

| 7,452,121 | B2* | 11/2008 | Cho | G02B 6/0085 362/294 |
| 8,773,618 | B2* | 7/2014 | Seo | G02F 1/133603 349/65 |
| 9,664,841 | B2* | 5/2017 | Hyun | G02F 1/133615 |
| 2013/0050616 | A1* | 2/2013 | Seo | G02F 1/133603 349/71 |
| 2013/0329161 | A1 | 12/2013 | Park et al. | |
| 2014/0160790 | A1* | 6/2014 | Park | B82Y 20/00 362/608 |
| 2014/0168571 | A1* | 6/2014 | Hyun | G02F 1/133615 349/61 |

(Continued)

FOREIGN PATENT DOCUMENTS

KR 10-2016-0084272 A 7/2016

OTHER PUBLICATIONS

Communication dated Feb. 15, 2019, issued by the European Patent Office in counterpart European Application No. 17202605.6.

*Primary Examiner* — Ashok Patel
(74) *Attorney, Agent, or Firm* — Sughrue Mion, PLLC

(57) ABSTRACT

A display apparatus includes: a display panel; a plurality of light sources configured to generate light to be transferred to the display panel; a light guide plate including a side surface onto which light generated by the plurality of light sources is incident, and a light exit surface through which the light is transmitted to the display panel; a light converter disposed between the plurality of light sources and the side surface of the light guide plate, the light converter being configured to convert a property of the light generated by the plurality of light sources; and a heat dissipation holder which accommodates the light converter, the heat dissipation holder being configured to dissipate heat generated by the plurality of light sources and the light converter.

19 Claims, 8 Drawing Sheets

(56) References Cited

U.S. PATENT DOCUMENTS

2014/0185271 A1* 7/2014 Hyun ................ G02B 6/0021
362/84
2016/0131826 A1* 5/2016 Gotou ................ G02B 6/0085
349/65
2016/0238779 A1 8/2016 Li

* cited by examiner

DISPLAY APPARATUS

CROSS-REFERENCE TO RELATED APPLICATION(S)

This application claims priority from Korean Patent Application No. 10-2016-0164495, filed on Dec. 5, 2016 in the Korean Intellectual Property Office, the disclosure of which is incorporated herein by reference.

BACKGROUND

1. Fields

Example embodiments of the present disclosure relate to a display apparatus, and more particularly, to a display apparatus having an improved heat dissipation structure.

2. Description of the Related Art

In general, a display apparatus is an apparatus which displays a screen and includes a monitor or a television. A display apparatus uses a self-luminous display panel such as an organic light emitting diode (OLED) panel, or a light-receiving and emitting display panel such as a liquid crystal display (LCD) panel.

The display apparatus which uses the light-receiving and emitting display panel may include an LCD panel to display a screen, and a backlight unit to supply light to the LCD panel. The backlight unit includes a light source module having a light source, and a plurality of optical sheets which receive light from the light source and guide the light to the LCD panel. The optical sheets may include a reflective sheet, a light guide plate, a diffusion sheet, a prism sheet, a polarizing sheet, or the like.

The light source generates light to be transmitted toward the display panel. However, if heat generated by the light source is not dissipated, light efficiency is lowered, and a light source module may be damaged or malfunction.

SUMMARY

One or more example embodiments provide a display apparatus having a structure that dissipates heat generated from a light source.

One or more example embodiments also provide a display apparatus having a structure that dissipates heat generated from a light source and a light converter.

One or more example embodiments also provide a display apparatus which minimizes exposure of a light converter.

According to an aspect of an example embodiment, there is provided a display apparatus including: a display panel; a plurality of light sources configured to generate light to be transferred to the display panel; a light guide plate including a side surface onto which light generated by the plurality of light sources is incident, and a light exit surface through which the light is transmitted to the display panel; a light converter disposed between the plurality of light sources and the side surface of the light guide plate, the light converter being configured to convert a property of the light generated by the plurality of light sources; and a heat dissipation holder which accommodates the light converter, the heat dissipation holder being configured to dissipate heat generated by the plurality of light sources and the light converter.

The heat dissipation holder may include a first heat dissipation frame and a second heat dissipation frame respectively disposed along opposite sides of the plurality of light sources, and the light converter may be disposed between the first heat dissipation frame and the second heat dissipation frame on a path of the light generated by the plurality of light sources.

The light converter may be supported by and accommodated between the first heat dissipation frame and the second heat dissipation frame.

The heat dissipation holder may include a plurality of first support protrusions and a plurality of second support protrusions extending from the first heat dissipation frame and the second heat dissipation frame, respectively, to support the light converter, and pairs of a first support protrusion of the plurality of first support protrusions and a second support protrusion of the plurality of second support protrusions alternately support opposite sides of the light converter along a longitudinal direction of the light converter.

The plurality of light sources may be arranged in a first direction extending along the side surface of the light guide plate, and the light converter and the heat dissipation holder may extend in the first direction.

The light converter may include a plurality of quantum dot tubes, each of the plurality of quantum dot tubes may include a quantum dot and a transmission tube surrounding the quantum dot, and each of the plurality of quantum dot tubes may be arranged in a same direction.

The heat dissipation holder may include a connection frame extending between and connecting the first heat dissipation frame and the second heat dissipation frame.

The light converter may have a width corresponding to a thickness of the light guide plate.

Each of the first heat dissipation frame and the second heat dissipation frame may include an insertion groove concavely formed in an inner surface of the heat dissipation frame, and at least a portion of the light converter may be accommodated in the insertion groove in a width direction.

The display apparatus may further include: a printed circuit board having a first surface on which the plurality of light sources are disposed; and a heat sink disposed on a second surface of the printed circuit board, wherein the heat dissipation holder may further include at least one extension member extending from one of one of the first heat dissipation frame and the second heat dissipation frame to be in direct contact with the heat sink.

The printed circuit board may include at least one heat dissipation hole formed adjacent to the heat dissipation holder, and the at least one extension member may be accommodated in the at least one heat dissipation hole to be in direct contact with the heat sink.

The at least one heat dissipation hole may include a plurality of heat dissipation holes arranged in a longitudinal direction of the heat dissipation holder, and the at least one extension member may include a plurality of extension members extending from at least one the first heat dissipation frame and the second heat dissipation frame so as to correspond to the plurality of heat dissipation holes.

The light converter may include a pair of heat transfer members arranged in parallel along both side portions of the plurality of quantum dot tubes, and the pair of heat transfer members may be in contact with the first and second heat dissipation frames and are configured to transfer heat from the plurality of quantum dot tubes to the first and second heat dissipation frames.

According to an aspect of another example embodiment, there is provided a display apparatus including: a display panel; a light source configured to generate light; a light guide plate configured to diffuse the light that is generated by the light source and incident on a side of the light guide plate, and transmit the light toward the display panel; a light converter disposed between the light source and the side of the light guide plate, the light converter being configured to convert a property of the light generated by the light source; and a heat dissipation holder configured to dissipate heat generated by the light source and light converter, the heat dissipation holder including: a first heat dissipation frame disposed along a first side of the light source; and a second heat dissipation frame disposed along a second side of the light source and forming a space to accommodate the light converter together with the first heat dissipation frame.

The light converter may be supported by and accommodated between the first heat dissipation frame and the second heat dissipation frame.

The heat dissipation holder may include a plurality of first support protrusions and a plurality of second support protrusions extending the first heat dissipation frame and the second heat dissipation frame, respectively, to support the light converter, and pairs of a first support protrusion of the plurality of first support protrusions and a second support protrusion of the plurality of second support protrusions may alternately support opposite sides of the light converter along a longitudinal direction of the light converter.

The light converter may be in contact with the first heat dissipation frame and the second heat dissipation frame along a longitudinal direction of the light converter.

The display apparatus may further include: a printed circuit board having a first surface on which the plurality of light sources are disposed, and at least one heat dissipation hole formed adjacent to the heat dissipation holder; and a heat sink provided on a second surface of the printed circuit board, wherein the heat dissipation holder may include at least one extension member that extends from one of the first dissipation frame and the second heat dissipation frame disposed adjacent to the printed circuit board, and is in contact with the heat sink through the at least one heat dissipation hole.

According to an aspect of another example embodiment, there is provided a display apparatus including: a display panel; a light source module including a printed circuit board and a plurality of light sources disposed on the printed circuit board and configured to generate light; a light guide plate configured to diffuse that is generated by the plurality of light sources and incident on a side of the light guide plate, and transmit the light toward the display panel; a light converter disposed between the plurality of light sources and the side of the light guide plate, the light converted being configured to convert a property of the light generated by the plurality of light sources; a heat sink disposed on the printed circuit board; and a heat dissipation holder including: a first heat dissipation frame; a second heat dissipation frame, the first heat dissipation frame and the second heat dissipation frame forming a space to accommodate the light converter; and an extension member extending from one of the first heat dissipation frame and the second heat dissipation frame to be in direct contact with the heat sink.

The printed circuit board may include at least one heat dissipation hole formed adjacent to the heat dissipation holder, and the at least one extension member may be accommodated in the at least one heat dissipation hole to be in direct contact with the heat sink.

BRIEF DESCRIPTION OF THE DRAWINGS

The above and/or other aspects will become apparent and more readily appreciated from the following description of example embodiments, taken in conjunction with the accompanying drawings of which.

DETAILED DESCRIPTION

Figure 1:
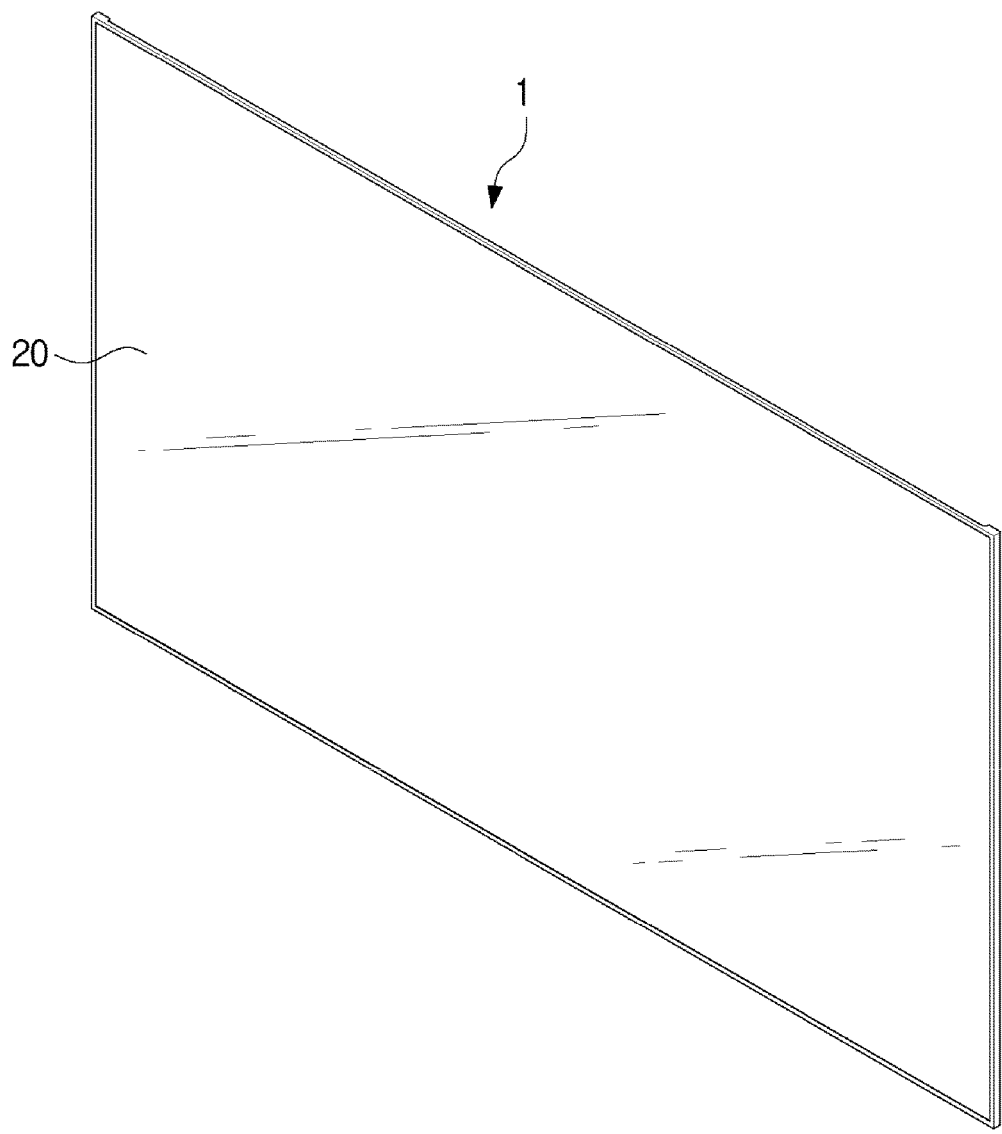
FIG. 1 is a perspective view of a display apparatus according to an example embodiment.

Configurations illustrated in the embodiments and the drawings described in the present specification are only examples, and thus it is to be understood that various modified examples, which may replace the embodiments and the drawings described in the present specification, are possible when filing the present application.

Also, like reference numerals or symbols denoted in the drawings of the present specification indicate elements or components that perform the substantially same functions.

Throughout the specification, the terms used are merely used to describe particular example embodiments, and are not intended to limit the present disclosure. As used herein, the singular forms "a", "an" and "the" are intended to include the plural forms as well, unless the context clearly indicates otherwise. Also, it is to be understood that the terms such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, example embodiments will be described in detail with reference to the accompanying drawings.

Figure 2:
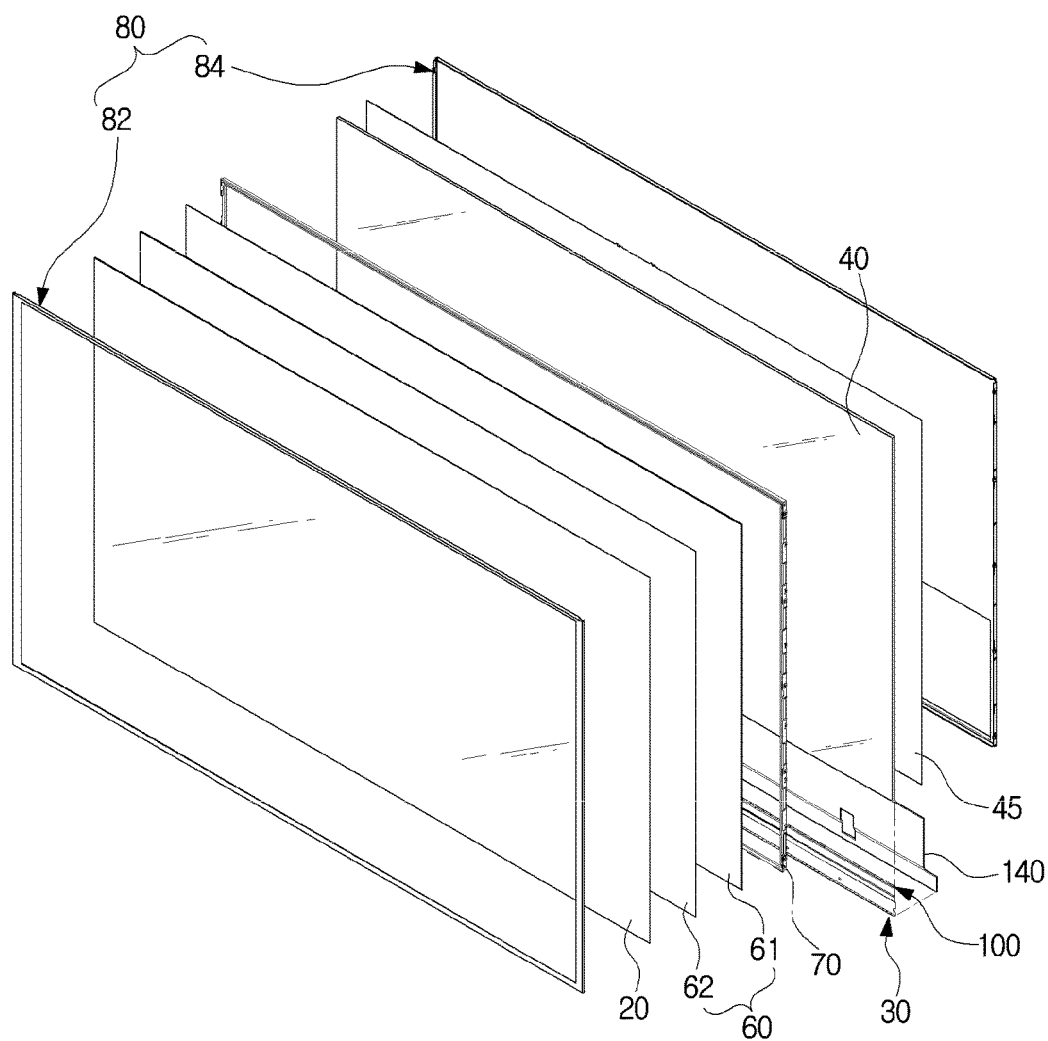
FIG. 2 is an exploded perspective view of a display apparatus according to an example embodiment.
Figure 3:
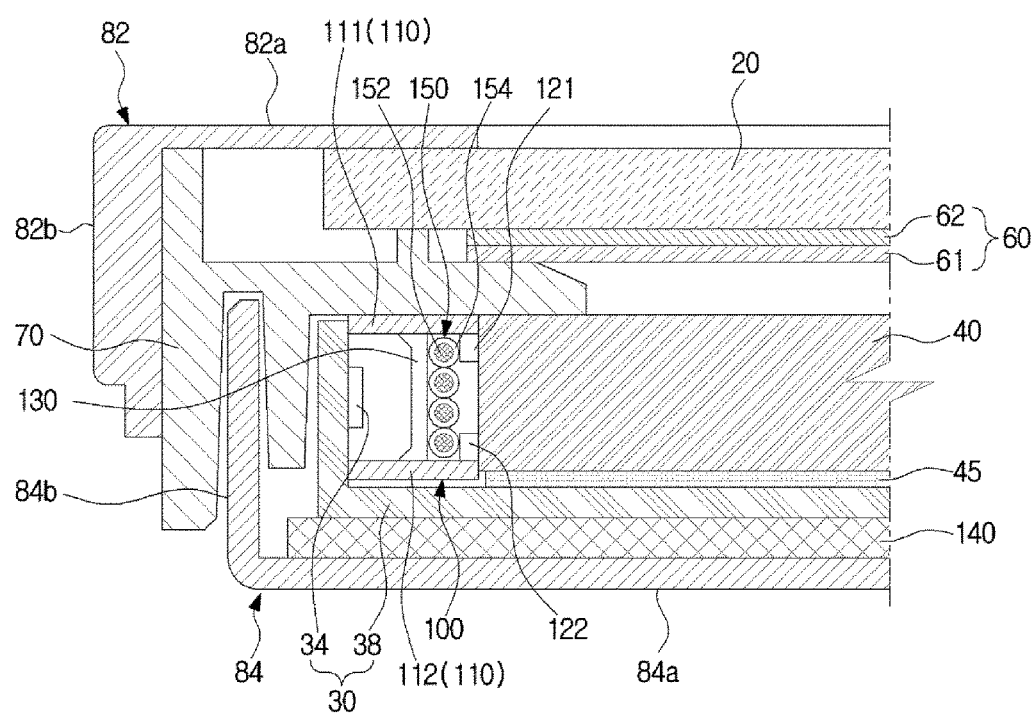
FIG. 3 is a partial cross-sectional view of a display apparatus according to an example embodiment.

FIG. 1 is a perspective view of a display apparatus according to an example embodiment, and FIG. 2 is an exploded perspective view of a display apparatus according to an example embodiment. FIG. 3 is a partial cross-sectional view of a display apparatus according to an example embodiment.

For convenience of explanation, a flat panel display apparatus is shown as an example of a display apparatus 1, but the display apparatus 1 is not limited to a flat panel display apparatus. The display apparatus 1 may be a curved display apparatus or a flexible (or bendable) display apparatus. That is, the display apparatus 1 may be any display apparatus in which a backlight unit is installed.

The display apparatus 1 may include a display module for displaying an image.

The display module may include a display panel 20 to display an image, and a backlight unit to supply light to the display panel 20. The backlight unit may include a light source module 30 and an optical sheet 60. For example, the backlight unit may include a pair of light source modules 30 disposed along at least one side of the display panel 20 behind the display panel 20, a light guide plate 40 disposed in a space between the display panel 20 and the light source module 30 and configured to diffuse light generated by the light source module 30 and to transmit the light to the display panel 20, an optical sheet 60 disposed between the display panel 20 and the light guide plate 40 and configured to convert the optical properties of light, a middle mold 70 supporting the display panel 20 and the light guide plate 40, and a display chassis 80 forming an outer appearance of the display apparatus 1. The display chassis 80 may include a top chassis 82 coupled to the front portion of the middle mold 70 to maintain a state in which the display panel 20 is installed in the middle mold 70, and a bottom chassis 84 coupled to the rear portion of the middle mold 70. The pair of light source modules 30 may be disposed on both inner edges of the bottom chassis 84.

The light source module 30 may be disposed on both inner edges of the bottom chassis 84 to radiate light toward the light guide plate. In the example embodiment, the light source module 30 may be disposed below the display module, although embodiments are not limited thereto. However, the light source module 30 may be applied to at least one from among a side portion or an upper portion of the display module, or may be applied along the edges of the display module. That is, light sources of the light source module 30 may be arranged according to an edge-type display method, or light sources may be arranged according to a direct-type display method.

The light guide plate 40, the display panel 20, and the top chassis 82 may be disposed in this order in the middle mold 70 in a front direction, and the bottom chassis 84 may be disposed in a rear direction. The middle mold 70 may support the components, and separate the display panel 20 and the bottom chassis 84 from each other.

As shown in FIG. 3, the top chassis 82 may include a bezel portion 82a to cover the edges of the front surface of the display panel 20, and a top side portion 82b extending backward from the edges of the bezel portion 82a to cover the side surface of the middle mold 70.

The bottom chassis 84 may include a rear surface portion 84a which forms a rear surface of the display module, and a bottom side portion 84b which extends in the front direction from edges of the rear surface portion 84a and is coupled into the middle mold 70.

The light source module 30 may include a light source 34 and a printed circuit board (PCB) 38.

The light source 34 may be a light emitting diode (LED). A plurality of light sources 34 may be provided, and the plurality of light sources 34 may be arranged at predetermined intervals on the PCB 38. The LED may be a blue light emitting element.

The light guide plate 40 may be spaced apart from the bottom chassis 84 so that the light sources 34 are disposed in a space between the light guide plate 40 and the inner surface of the bottom chassis 84. Light generated by the light sources 34 may be incident onto one side of the light guide plate 40, and the incident light may be emitted to the display panel 20 through a light exit surface of the light guide plate 40.

A reflective member 45 may be provided on the rear surface of the light guide plate 40 such that light emitted from the light sources 34 can be directed to the front surface of the light guide plate 40. The reflecting member 45 may be formed as a reflecting plate separately from the light guide plate 40 and disposed on the back surface of the light guide plate 40. Also, the reflecting member 45 may be integrated into the light guide plate 40. Also, the reflective member 45 may be formed by a reflective coating on the rear surface of the light guide plate 40.

The light guide plate 40 may be configured to guide and transmit light generated by the light sources 34. For this, the light guide plate 40 may be formed of a transparent resin material. The light guide plate 40 may be spaced a predetermined distance apart from the light sources 34 so as to minimize deformation due to heat generated by the light sources 34.

Figure 4:
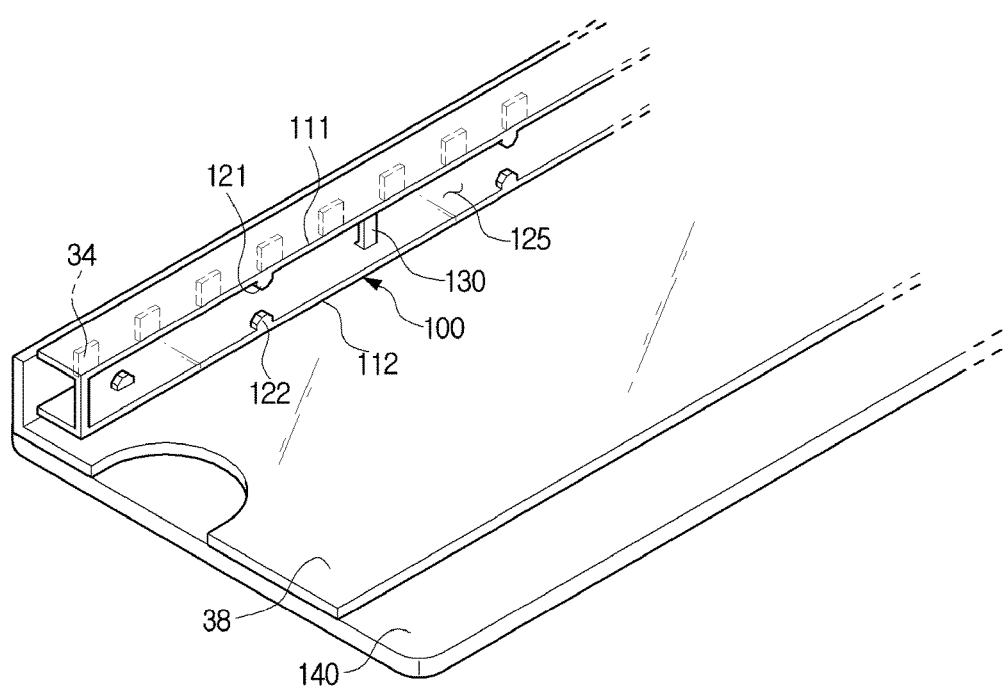
FIG. 4 is a perspective view illustrating a heat dissipation holder, a light source module, and a heat sink of a display apparatus according to an example embodiment.
Figure 5:
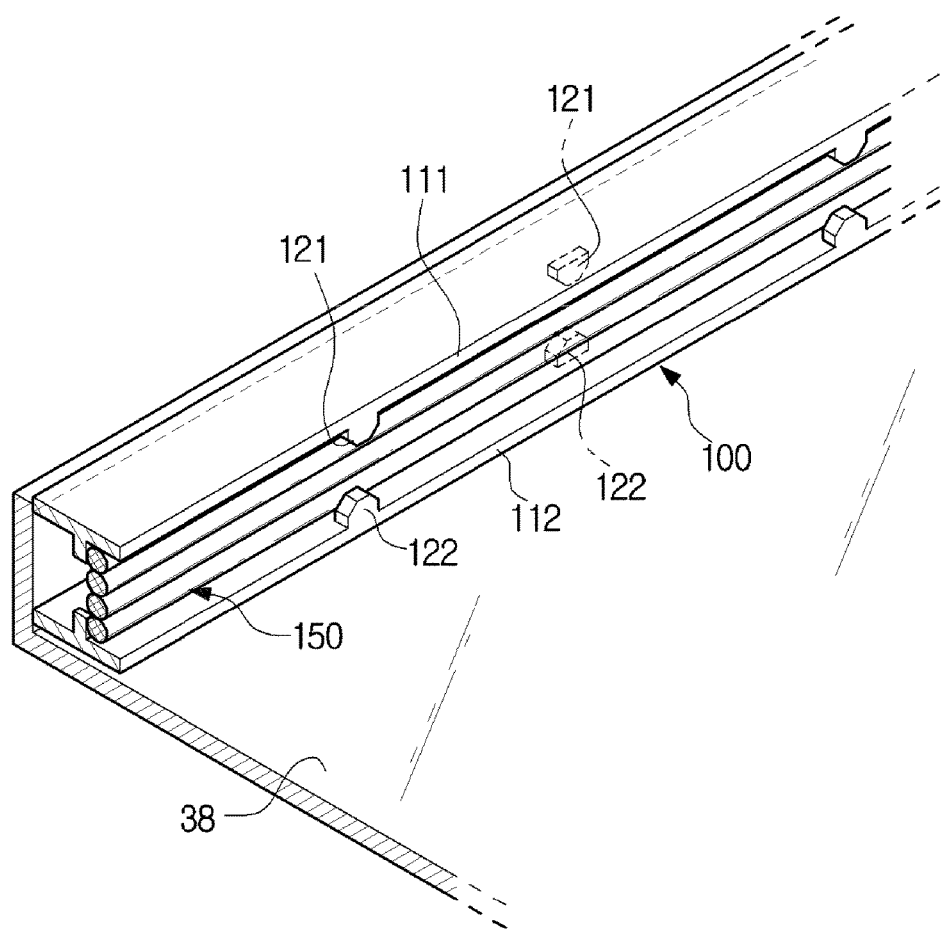
FIG. 5 is a perspective view illustrating a heat dissipation holder, a light converter, and a light source module of a display apparatus according to an example embodiment.

FIG. 4 is a perspective view illustrating a heat dissipation holder, a light source module, and a heat sink of a display apparatus according to an example embodiment. FIG. 5 is a perspective view illustrating a heat dissipation holder, a light converter, and a light source module of a display apparatus according to an example embodiment.

The display apparatus 1 may include a heat dissipation holder 100.

The heat dissipation holder 100 may be provided with a light converter 150. The heat dissipation holder 100 may be disposed adjacent to the light sources 34 to dissipate heat generated by the light sources 34 or the light converter 150. The heat dissipation holder 100 may support the light converter 150, while absorbing heat generated by the light converter 150 and/or the light sources 34. Therefore, the heat dissipation holder 100 can prevent the light sources 34 and the light converter 150 from being damaged or malfunctioning due to generating excessive heat. If the plurality of light sources 34 are arranged in a first direction, the light converter 150 and the heat dissipation holder 100 may extend in the first direction.

The heat dissipation holder 100 may include a heat dissipation frame 110.

A pair of heat dissipation frames 110 may be disposed along both sides of the light sources 34, respectively. The pair of heat dissipation frames 110 may include a first heat dissipation frame 111 disposed along one side of the light sources 34, and a second heat dissipation frame 112 disposed along the other side of the light sources 34. The second heat dissipation frame 112 may be disposed adjacent to the PCB 38, or may be in contact with the printed circuit board 38. The pair of heat dissipation frames 110 may be spaced a predetermined distance apart from each other. The pair of heat dissipation frames 110 may form a receiving space 125 with the light converter 150 provided in between. The pair of heat dissipation frames 110 may be disposed along both sides of the light sources 34, so that light generated by the light sources 34 is directed to the light guide plate 40 through a space between the pair of heat dissipation frames 110. That is, an optical path from the light sources 34 to the light guide plate 40 may be formed between the pair of heat dissipation frames 110. The light converter 150 may be disposed between the pair of heat dissipation frames 110, and may be disposed on the path of light toward the light guide plate 40 from the light sources 34.

The heat dissipation holder 100 may include at least one support protrusion 121 and 122.

The at least one support protrusion 121 and 122 may be configured to support the light converter 150 accommodated in the receiving space 125 formed between the first and second heat dissipation frames 111 and 112. The at least one support protrusion 121 and 122 may protrude from any one of the first and second heat dissipation frames 111 and 112 toward the other one of the first and second heat dissipation frames 111 and 112. That is, the at least one support protrusion 121 and 122 may protrude from the first and second heat dissipation frames 111 and 112 to the receiving space 125 to form a size of the receiving space 125.

The at least one support protrusion 121 and 122 may include a first support protrusion 121 extending from the first heat dissipation frame 111, and a second support protrusion 122 extending from the second heat dissipation frame 112.

A plurality of the first support protrusions 121 and a plurality of second support protrusions 122 may be formed in the first and second heat dissipation frames 111 and 112, respectively. The plurality of first support protrusions 121 and the plurality of second support protrusions 122 may be arranged along the longitudinal direction of the light converter 150. As shown in FIG. 5, the first and second support protrusions 121 and 122 may be alternately arranged along the longitudinal direction of the light converter 150. That is, the plurality of first protrusions 121 and the plurality of second support protrusions 122 may be arranged to alternately support one side and the other side of the light converter 150 along the longitudinal direction of the light converter 150.

The light converter 150 may be disposed between the light sources 34 and the light guide plate 40 to convert the properties of light emitted from the light sources 34 to the light guide plate 40. More specifically, the light converter 150 may convert a wavelength of the light.

One side of the light converter 150 may be in contact with the first heat dissipation frame 111, and the other side of the light converter 150 may be in contact with the second heat dissipation frame 112. When the light emitted from the light sources 34 passes through the light converter 150, heat may be generated by the light converter 150. The light converter 150 may transfer heat to the heat dissipation frames 110 to prevent excessive heat from being generated in the light converter 150.

The light converter 150 may include a plurality of quantum dot (QD) tubes. Each of the plurality of QD tubes may include a QD 152 and a transmission tube 154 surrounding the QD 152. Each transmission tube 154 may form an arrangement space therein, and the QD 152 may be disposed in the arrangement space. The arrangement space of the transmission tube 154 may be hermetically closed, and the QD 152 may be disposed in the hermetically closed space. Therefore, the QD 152 may be not exposed to an external environment, so that oxidation and deformation of the QD 152 due to moisture can be prevented. The plurality of QD tubes may be arranged side by side. A width of the light converter 150 may correspond to a thickness of the light guide plate 40. That is, a width formed by arranging the plurality of QD tubes side by side may correspond to a thickness of the light guide plate 40.

The QD 152 will be described below. If electrons receive energy, electrons in the valence band are excited to the conduction band. Thereafter, the electrons lose energy again to fall down to the valence band. At this time, the electrons emit energy in the form of light. A QD generates strong fluorescence in a narrow wavelength band. The QD can generate all colors of visible light according to its size. Also, since the QD generates a natural color by itself, it is a material having no color loss and high color reproducibility. As the particle size of a QD is smaller, the QD generates light of a shorter wavelength light, and as the particle size of a QD is larger, the QD generates light of a longer wavelength. The QD may be a chemical compound such as Cadmium Selenide (CdSe), Cadmium Sulfide (CdS), Cadmium Telluride (CdTe), Zinc Selenide (ZnSe), Zinc Telluride (ZnTe), and Zinc Sulfide (ZnS).

The heat dissipation holder 100 may include a connection frame 130.

The connection frame 130 may extend between and connect the first and second heat dissipation frames 111 and 112. The connection frame 130 and the first and second heat dissipation frames 111 and 112 may be integrated into one body. The connection frame 130 may support the light converter 150 disposed in the receiving space 125, while connecting the first and second heat dissipation frames 111 and 112.

A plurality of connection frames 130 may be provided along the longitudinal direction of the heat dissipation frames 110, and the plurality of connection frames 130 may be alternately arranged along the longitudinal direction of the light converter 150. That is, the plurality of connection frames 130 may be arranged to alternately support one side and the other side of the light converter 150 along the longitudinal direction of the light converter 150.

The display apparatus 1 may include a heat sink 140.

The heat sink 140 may face the PCB 38 to dissipate heat generated by the light sources 34 or the light converter 150. The light sources 34 may be arranged on one surface of the PCB 38, and the heat sink 140 may be in contact with the other surface of the PCB 38. The heat sink 140 may absorb heat generated by the PCB 38, the light sources 34, and the light converter 150.

Hereinafter, a display apparatus according to another example embodiment will be described. Hereinafter, repeated descriptions about the same components as the above-described components will be omitted.

Figure 6:
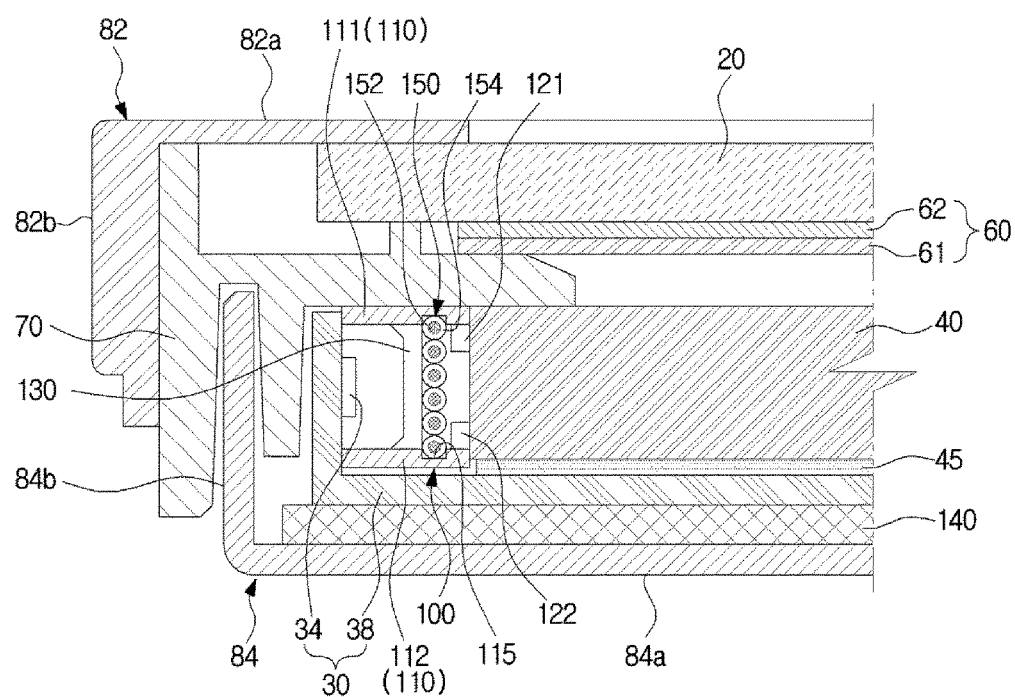
FIG. 6 is a partial cross-sectional view of a display apparatus according to another example embodiment.

FIG. 6 is a partial cross-sectional view of a display apparatus according to another example embodiment.

The heat dissipation holder 100 may include an insertion groove 115.

The insertion groove 115 may be formed in the inner surfaces of the heat dissipation frames 110 so that the end of the light converter 150 can be inserted in the insertion groove 115. The insertion groove 115 may be formed along the longitudinal direction of the heat dissipation frames 110, and the end of the light converter 150 may be inserted in the insertion groove 115. Since the light converter 150 is inserted in the insertion groove 115, the light converter 150 may be supported by the heat dissipation holder 100 without any other configuration. The heat dissipation holder 100 may be provided with the support protrusions 121 and 122 that are adjacent to the insertion groove 115.

The insertion groove 115 may be formed in both the first and second heat dissipation frames 111 and 112, or in any one of the first and second heat dissipation frames 111 and 112. The shape of the insertion groove 115 is not limited as long as a portion of the light converter 150 can be inserted in the insertion groove 115.

Hereinafter, a display apparatus according to another example embodiment will be described. Hereinafter, repeated descriptions about the same components as the above-described components will be omitted.

Figure 7:
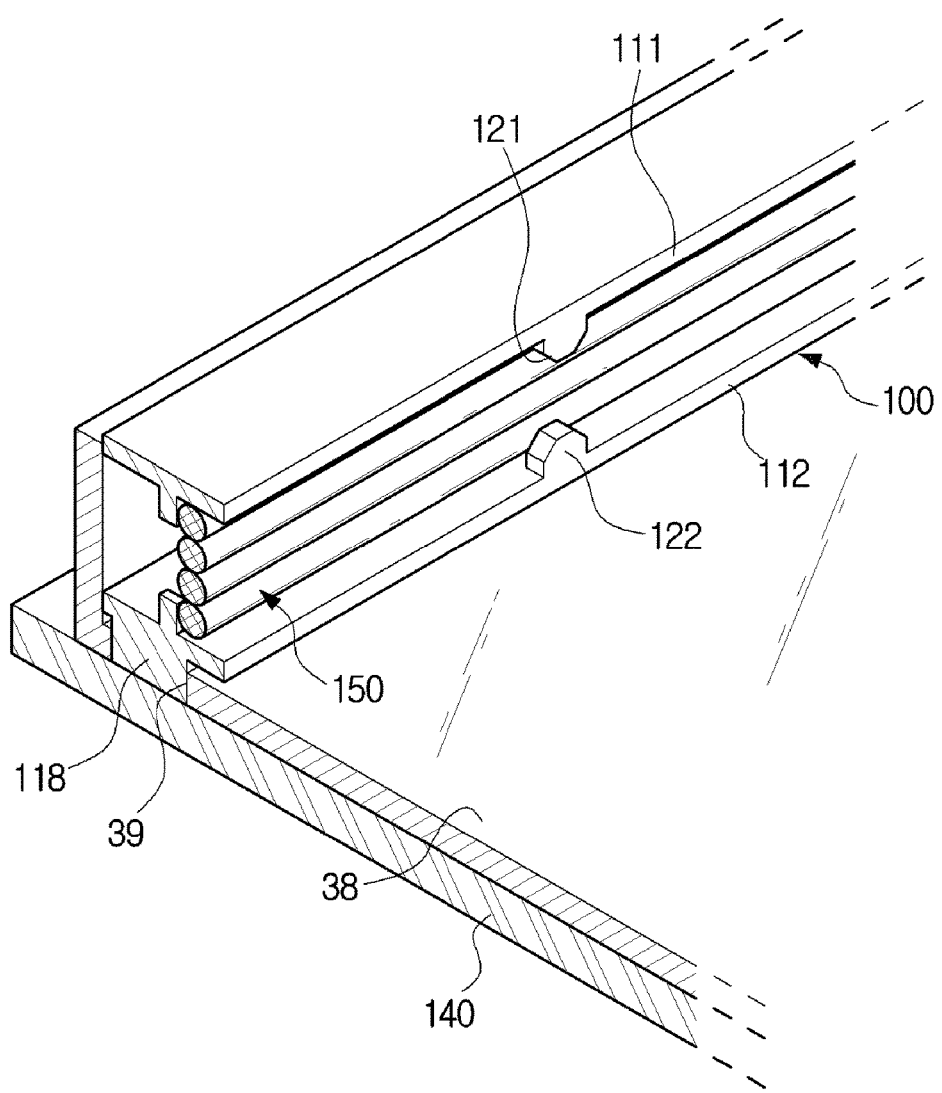
FIG. 7 is a perspective view illustrating a heat dissipation holder, a light source module, and a heat sink of a display apparatus according to another example embodiment.

FIG. 7 is a perspective view illustrating a heat dissipation holder, a light source module, and a heat sink of a display apparatus according to another example embodiment.

The printed circuit board 38 may include at least one heat dissipation hole 39. The at least one heat dissipation hole 39 may be formed on the PCB 38 to be adjacent to the heat dissipation holder 100.

Also, a plurality of heat dissipation holes 39 may be arranged along the longitudinal direction of the heat dissipation holder 100.

The heat dissipation holder 100 may include at least one extension member 118. The at least one extension member 118 may extend from the heat dissipation frames 110, and may be accommodated in at least one corresponding heat dissipation hole 39 to be in contact with the heat sink 140. The extension member 118 may be disposed to correspond to the heat dissipation hole 39, and may be accommodated in the heat dissipation hole 39 to be in contact with the heat sink 140. The extension member 118 may be in direct contact with the heat sink 140 so that heat generated by the light sources 34 and/or the light converter 150 and absorbed by the heat dissipation holder 100 can be efficiently transferred to the heat sink 140 through the extension member 118. Accordingly, it is possible to prevent excessive heat from being generated in the light sources 34 and the light converter 150.

The extension member 118 may be integrally formed with the heat dissipation frames 110. The extension member 118 may extend from the second heat dissipation frame 112 that is adjacent to the PCB 38.

Also, a plurality of extension members 118 may be arranged along the longitudinal direction of the heat dissipation holder 100, and the plurality of extension members 118 may be disposed to correspond to the plurality of heat dissipation holes 39.

Hereinafter, a display apparatus according to another example embodiment will be described. Hereinafter, descriptions about the same components as the above-described components will be omitted in order to avoid unnecessary descriptions.

Figure 8:
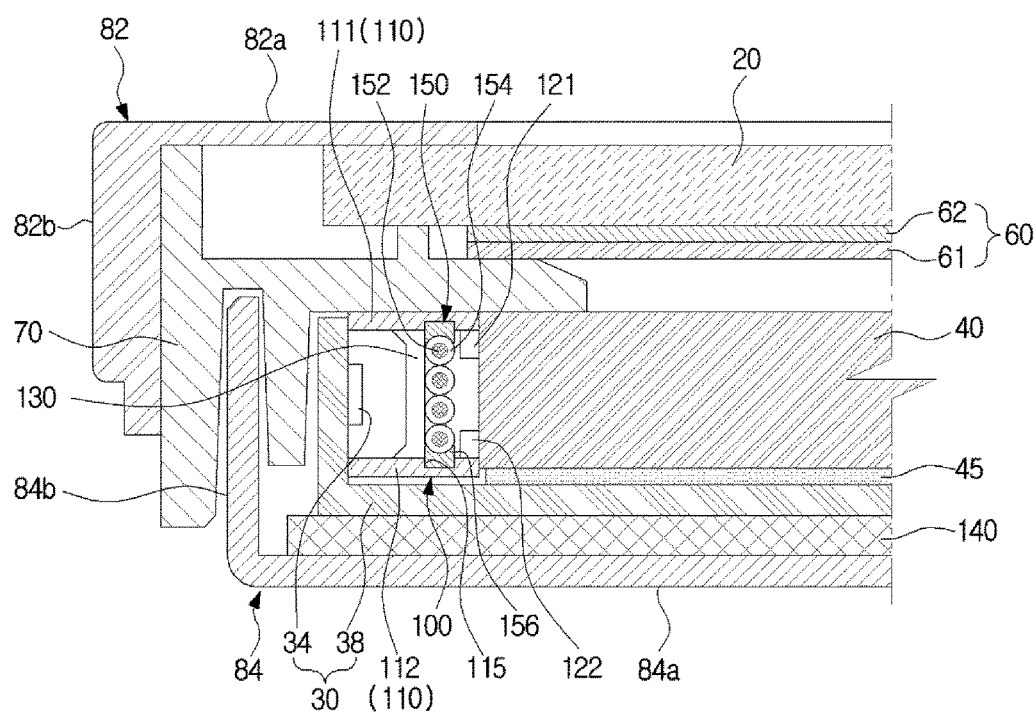
FIG. 8 is a partial cross-sectional view of a display apparatus according to another example embodiment.

FIG. 8 is a partial cross-sectional view of a display apparatus according to another example embodiment.

The light converter 150 may further include a pair of heat transfer members 156.

The heat transfer members 156 may be respectively disposed at both ends of the light converter 150. More specifically, the heat transfer members 156 may be in contact the first and second heat dissipation frames 111 and 112 at both ends of the light converter 150. The heat transfer members 156 may be in contact with the first and second heat dissipation frames 111 and 112 to be inserted into the insertion groove 115, as shown in FIG. 8. The heat transfer members 156 may be any configuration disposed at both ends of the light converter 150 so that heat generated by the light converter 150 can be rapidly transferred to the heat dissipation frames 110.

As is apparent from the above description, according to the example embodiments, the color reproducibility of the LCD apparatus for displaying a screen using light incident from the backlight unit can be improved.

According to the example embodiments, by mounting QDs on the heat dissipation holder, it is possible to improve color reproducibility and to improve heat dissipation efficiency.

According to the example embodiments, it is possible to provide an optimal layout design between QDs and a heat dissipation device which can improve color reproducibility of a display apparatus.

Although a few example embodiments have been shown and described above, the disclosure is not limited to the aforementioned specific example embodiments. Those skilled in the art may variously modify the example embodiment without departing from the spirit and scope of the present disclosure defined by the following claims.

What is claimed is:

1. A display apparatus comprising:
    a display panel;
    a plurality of light sources configured to generate light to be transferred to the display panel;
    a light guide plate comprising a side surface onto which light generated by the plurality of light sources is incident, and a light exit surface through which the light is transmitted to the display panel;
    a light converter disposed between the plurality of light sources and the side surface of the light guide plate, the light converter being configured to convert a property of the light generated by the plurality of light sources; and
    a heat dissipation holder which accommodates the light converter, the heat dissipation holder being configured to dissipate heat generated by the plurality of light sources and the light converter,
    wherein the heat dissipation holder comprises:
    a first heat dissipation frame and a second heat dissipation frame respectively disposed along opposite sides of the plurality of light sources; and
    a plurality of first support protrusions and a plurality of second support protrusions extending from the first heat dissipation frame and the second heat dissipation frame, respectively, to support the light converter,
    wherein the plurality of first support protrusions and the plurality of second support protrusions include inner support protrusions supporting an inner side of the light converter and outer support protrusions supporting an outer side of the light converter, and
    wherein the inner support protrusions are configured to separate the plurality of light sources provided at one end of the first and second heat dissipation frames and the light converter surrounded by the first and second heat dissipation frames by a predetermined distance.

2. The display apparatus according to claim 1, wherein the light converter is disposed between the first heat dissipation frame and the second heat dissipation frame on a path of the light generated by the plurality of light sources.

3. The display apparatus according to claim 2, wherein the light converter is supported by and accommodated between the first heat dissipation frame and the second heat dissipation frame.

4. The display apparatus according to claim 2,
    wherein pairs of a first support protrusion of the plurality of first support protrusions and a second support protrusion of the plurality of second support protrusions alternately support opposite sides of the light converter along a longitudinal direction of the light converter.

5. The display apparatus according to claim 1, wherein the plurality of light sources are arranged in a first direction extending along the side surface of the light guide plate, and the light converter and the heat dissipation holder extend in the first direction.

6. The display apparatus according to claim 1, wherein the light converter comprises a plurality of quantum dot tubes,
   each of the plurality of quantum dot tubes comprises a quantum dot and a transmission tube surrounding the quantum dot, and
   each of the plurality of quantum dot tubes is arranged in a same direction.

7. The display apparatus according to claim 2, wherein the heat dissipation holder comprises a connection frame extending between and connecting the first heat dissipation frame and the second heat dissipation frame.

8. The display apparatus according to claim 1, wherein the light converter has a width corresponding to a thickness of the light guide plate.

9. The display apparatus according to claim 2, wherein each of the first heat dissipation frame and the second heat dissipation frame comprises an insertion groove concavely formed in an inner surface thereof, and
   at least a portion of the light converter is accommodated in the insertion groove in a width direction.

10. The display apparatus according to claim 2, further comprising:
    a printed circuit board having a first surface on which the plurality of light sources are disposed; and
    a heat sink disposed on a second surface of the printed circuit board,
    wherein the heat dissipation holder further comprises at least one extension member extending from one of one of the first heat dissipation frame and the second heat dissipation frame to be in direct contact with the heat sink.

11. The display apparatus according to claim 10, wherein the printed circuit board comprises at least one heat dissipation hole formed adjacent to the heat dissipation holder, and
    the at least one extension member is accommodated in the at least one heat dissipation hole to be in direct contact with the heat sink.

12. The display apparatus according to claim 11, wherein the at least one heat dissipation hole comprises a plurality of heat dissipation holes arranged in a longitudinal direction of the heat dissipation holder, and
    the at least one extension member comprises a plurality of extension members extending from at least one the first heat dissipation frame and the second heat dissipation frame so as to correspond to the plurality of heat dissipation holes.

13. The display apparatus according to claim 6, wherein the light converter comprises a pair of heat transfer members arranged in parallel along both side portions of the plurality of quantum dot tubes, and
    the pair of heat transfer members is in contact with the first and second heat dissipation frames and is configured to transfer heat from the plurality of quantum dot tubes to the first and second heat dissipation frames.

14. A display apparatus comprising:
    a display panel;
    a light source configured to generate light;
    a light guide plate configured to diffuse the light that is generated by the light source and incident on a side of the light guide plate, and transmit the light toward the display panel;
    a light converter disposed between the light source and the side of the light guide plate, the light converter being configured to convert a property of the light generated by the light source; and
    a heat dissipation holder configured to dissipate heat generated by the light source and the light converter, the heat dissipation holder comprising:
        a first heat dissipation frame disposed along a first side of the light source;
        a second heat dissipation frame disposed along a second side of the light source and forming a space to accommodate the light converter together with the first heat dissipation frame; and
        a plurality of first support protrusions and a plurality of second support protrusions extending from the first heat dissipation frame and the second heat dissipation frame, respectively, to support the light converter,
    wherein the plurality of first support protrusions and the plurality of second support protrusions include inner support protrusions supporting an inner side of the light converter and outer support protrusions supporting an outer side of the light converter, and
    wherein the inner support protrusions are configured to separate the light source provided at one end of the first and second heat dissipation frames and the light converter surrounded by the first and second heat dissipation frames by a predetermined distance.

15. The display apparatus according to claim 14, wherein the light converter is supported by and accommodated between the first heat dissipation frame and the second heat dissipation frame.

16. The display apparatus according to claim 14, wherein pairs of a first support protrusion of the plurality of first support protrusions and a second support protrusion of the plurality of second support protrusions alternately support opposite sides of the light converter along a longitudinal direction of the light converter.

17. The display apparatus according to claim 14, wherein the light converter is in contact with the first heat dissipation frame and the second heat dissipation frame along a longitudinal direction of the light converter.

18. The display apparatus according to claim 14, further comprising:
    a printed circuit board having a first surface on which the light source is disposed, and at least one heat dissipation hole formed adjacent to the heat dissipation holder; and
    a heat sink provided on a second surface of the printed circuit board,
    wherein the heat dissipation holder comprises at least one extension member that extends from one of the first heat dissipation frame and the second heat dissipation frame disposed adjacent to the printed circuit board, and is in contact with the heat sink through the at least one heat dissipation hole.

19. A display apparatus comprising:
    a display panel;
    a light source module comprising a printed circuit board including at least one heat dissipation hole and a plurality of light sources disposed on the printed circuit board and configured to generate light;
    a light guide plate configured to diffuse that is generated by the plurality of light sources and incident on a side of the light guide plate, and transmit the light toward the display panel;
    a light converter disposed between the plurality of light sources and the side of the light guide plate, the light converted being configured to convert a property of the light generated by the plurality of light sources;

a heat sink disposed on one surface of the printed circuit board; and a heat dissipation holder disposed on the other surface of the printed circuit board and comprising:
- a first heat dissipation frame;
- a second heat dissipation frame forming a space to accommodate the light converter; and
- the second heat dissipation frame spaced apart from the first heat dissipation frame to form a space in which the plurality of light sources and the light converter are disposed between the first heat dissipation frame and the second heat dissipation frame, the second heat dissipation frame being configured to be in contact with the printed circuit board; and
- an extension member extending from the second heat dissipation frame through the at least one heat dissipation hole to be in direct contact with the heat sink.

* * * * *